United States Patent [19]

Heinz

[11] Patent Number: 5,010,284

[45] Date of Patent: Apr. 23, 1991

[54] DEVICE FOR THE OPTICAL RECORDING OF RAPID PROCESSES WITH A TV CAMERA

[75] Inventor: Wilhelm Heinz, Linkenheim, Fed. Rep. of Germany

[73] Assignee: European Atomic Energy Community, Luxembourg

[21] Appl. No.: 437,565

[22] Filed: Nov. 17, 1989

[30] Foreign Application Priority Data

Nov. 18, 1988 [LU] Luxembourg .......................... 87392

[51] Int. Cl.[5] .......................... G09G 1/04; H01J 29/52

[52] U.S. Cl. ...................................... 315/384; 315/367

[58] Field of Search ......................... 315/367, 384, 386

[56] References Cited

U.S. PATENT DOCUMENTS 3,424,940 1/1969 Foote ................................. 315/367

4,019,090 4/1977 Wolff et al. .......................... 315/8.5

OTHER PUBLICATIONS

Review of Scientific Instruments, vol. 53, No. 11, Nov. 1982, pp. 1762–1769, American Institute of Physics, New York, B. W. Noel, et al.: "Television Camera for Fast-Scan Data Acquisition".

Patent Abstracts of Japan, vol. 9, No. 255, (E–349) [1978], Oct. 12, 1985; & JP–A–60 103 876 (Hitachi Seisakusho K.K.), 6–8–85.

Patent Abstracts of Japan, vol. 11, No. 7, (E–469) [2454], Jan. 9, 1987; & JP–A–61 184 061 (Sharp Corp.) 8–16–86.

*Primary Examiner*—Gregory C. Issing

*Attorney, Agent, or Firm*—Sughrue, Mion, Zinn, Macpeak & Seas

[57] ABSTRACT

The invention relates to a device for the optical recording of rapid proceses with a TV camera, which comprises means for deviating and suppressing the beam, in order to make the scanning beam run successively and cyclically over N lines of a picture plane on which the processes are projected.

A cyclic line counter (14) carries out one counting step for each line pulse and supplies a counting end pulse after p line pulses respectively, N/p being in integer >>1.

The end-of-count pulse is applied to the beam suppression circuit (13) of the TV camera (1) for the picture beam suppression and to a sawtooth generator (12), which controls the vertical deviation (4) of the beam.

6 Claims, 2 Drawing Sheets

DEVICE FOR THE OPTICAL RECORDING OF RAPID PROCESSES WITH A TV CAMERA

BACKGROUND OF THE INVENTION

The invention relates to a device for the optical recording of rapid processes with a TV camera, which comprises means for deviating and suppressing the beam, in order to make the scanning beam run successively and cyclically over N lines of a picture plane on which the processes are optically projected.

For control and/or analysis purposes, laboratory and industrial processes often require the optical recording of rapidly changing phenomena.

The picture sequence of conventional TV cameras of the European standard is 25 Hz, so that the recording of a TV picture requires 40 ms, or 20 ms for a half-frame. Higher picture frequencies can be obtained with high speed cameras, the price of which, however, is significantly higher than that of TV systems. Furthermore, such a camera is based on the principle of photochemical (film) recording, so that an immediate interpretation, for example a computer-assisted interpretation of the pictures, is not possible.

Special TV systems with increased resolution for professional use have already been developed, in which the number of lines and the speed of line scanning are doubled with respect to the European TV standard, while a half-frame is still scanned in 20 ms. Finally, a TV system is conceivable in which the geometrical resolution, i.e. the number of lines is not increased, but only the scanning speed of one line is increased, so that with a constant or even reduced number of lines, a higher picture sequence frequency can be obtained. This would, however, necessitate an expensive new concept of the whole TV system.

Contrary hereto, it is the aim of the invention to provide a device as mentioned above, which permits, with simple means and even in a very flexible way, TV recordings of rapid processes with a high and selectable resolution in time.

SUMMARY OF THE INVENTION

It is, therefore, an object of the present invention to provide a device for the optical recording of rapid processes with a TV camera, to obtain a higher picture sequence frequency. The device comprises means for deviating and suppressing the beam in order to make the scanning beam run successively and cyclically over N lines of a picture plane on which the processes are projected;

a cyclic line counter, which carries out one counting step for each line pulse and which supplies an end-of-count pulse after p line pulses respectively, N/p being an integer $>>1$, the end-of-count pulse being applied to the beam suppression circuit of the TV camera for picture beam suppression;

and a sawtooth generator synchronized with the output pulses of the counter and to control the vertical deviation of the beam.

Preferably, the sawtooth generator and the beam suppression circuit are controlled via a delay device, the delay time of which constitutes a selectable part of a line period and which is triggered by the output of the counter.

In a preferred embodiment, the line counter is a programmable counter.

BRIEF DESCRIPTION OF THE DRAWINGS

The invention will now be described in more detail by means of a preferred embodiment with reference to the drawings.

DETAILED DESCRIPTION OF THE PREFERRED EMBODIMENT

Figure 1:
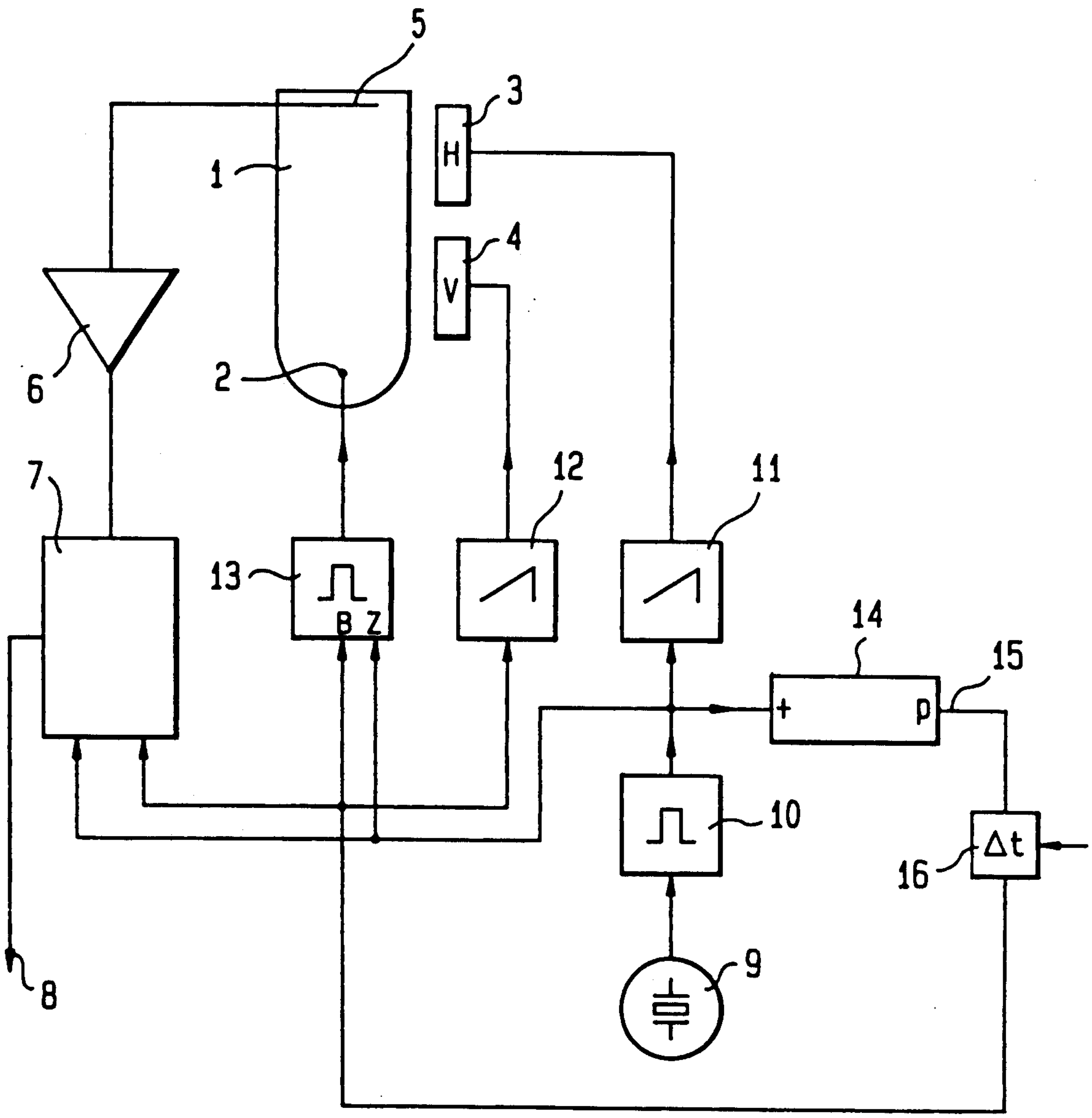
FIG. 1 shows a block diagram of a device according to the invention.

FIG. 1 shows a TV recording tube 1, which comprises in the usual way a cathode beam unit 2 for creating a scanning beam and beam deviating means 3, 4 for the horizontal deviation as well as for the vertical deviation of the beam, respectively. The beam originating from the cathode beam unit 2 can be moved systematically over a picture plane 5, on which the rapid processes to be recorded are optically projected and in which, during scanning, a high electrical signal is produced as a function of the brightness value of a scanned point. This electrical signal is conveyed to a pre-amplifier 6.

The signal from pre-amplifier 6 is mixed in a known way in a video amplifier 7 with standardized synchronization and level definition pulses for the black level and the white level and is then delivered as a video signal to an output 8.

An oscillator 9 oscillating at 15.625 kHz controls the deviation means 3 and 4. A pulse former 10 following the oscillator supplies narrow pulses of said frequency to a sawtooth generator 11, which is connected to the horizontal deviation means 3.

In a common TV camera, the pulse former 10 is followed by a divider by N=312, whose output is applied to a sawtooth generator 12 for controlling the vertical deviation means 4. Further, in a usual TV camera, there is a beam suppression circuit 13, which is synchronized with the sawtooth pulses supplied by the generators 11 and 12 and is used in the deviation means 3 and 4, to provide beam suppression pulses of appropriate width for suppressing the beam during the line (Z) and the picture change periods (B), respectively.

According to the invention, as shown in FIG. 1, this usual circuitry of a TV camera is only slightly modified, i.e. as concerns the vertical deviations and the beam suppression for the picture change synchronized therewith. The control pulses for the vertical deviation are not derived from the output pulses of the pulse former 10 via a fixed divider through N (312), but rather a cyclic counter 14 is supplied with the output pulses from the pulse former 10 with a sequence frequency of 15.625 kHz. Counter 14 counts these pulses from pulse former 10. The counting capacity of this counter, i.e. the number of count steps p, which this counter needs to reach its initial state, is only a fraction of the value N (312) generally used in common TV cameras. In particular, p is chosen such that the ratio of line number N to p is an integer significantly greater than 1. In a preferred embodiment, the counter 14 is a programmable counter, whose value p can be regulated at a control desk. Therefore, at an output 15 of this counter, a narrow pulse appears after the scanning of p lines. This pulse is used via a delay means 16 to control the sawtooth generator 12 as well as to control both the vertical deviation means 4 and the beam suppression circuit 13 provided for the cathode beam unit 2. By means of switches (not shown), the slope of a sawtooth 12 is adapted to the shortened picture cycle. These switches can be regulated manually or automatically together with the counter 14, so that each value of p corresponds to a defined slope.

Figure 2:
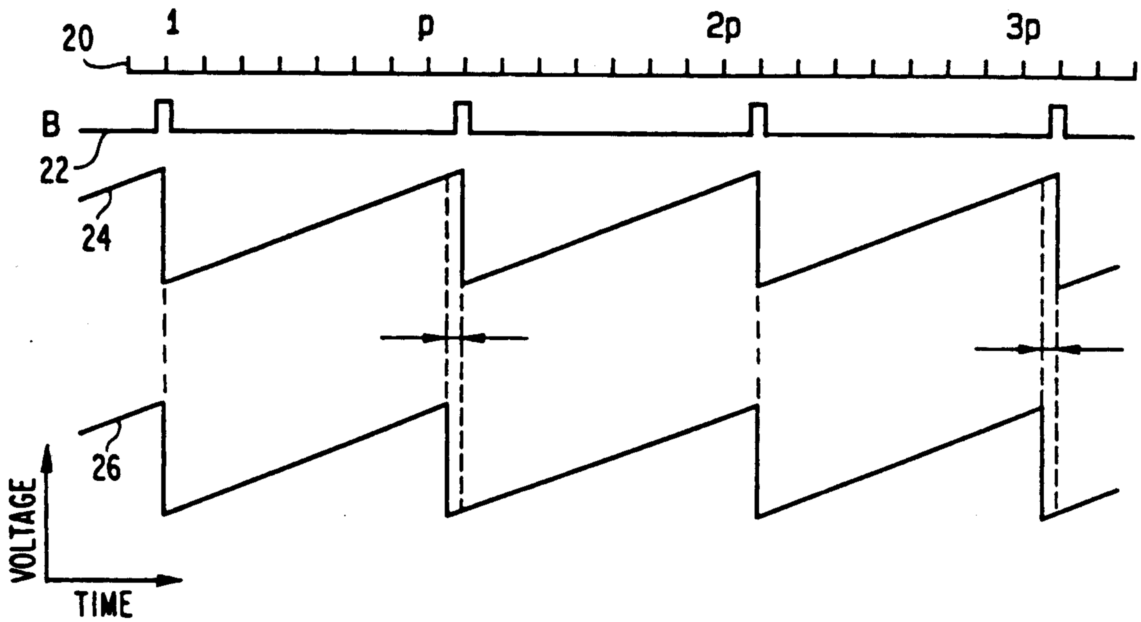
FIG. 2 shows some characteristic pulse shapes which occur during the operation of the device according to FIG. 1.

The device shown in FIG. 1 is further explained with respect to the pulse diagrams of FIG. 2.

Figure 3:
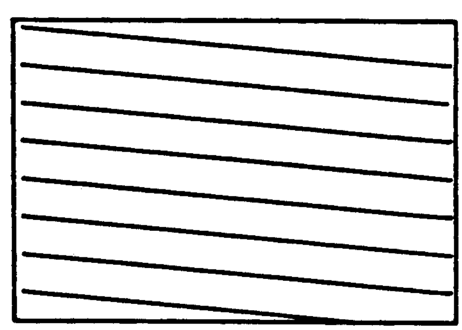
FIG. 3 shows the path of the cathode beam over the picture plane of the camera for $p=8$.

For the sake of simplicity, the number p has been chosen to be eight, which is very small. In the first diagram of the FIG. 2, a series of line pulses 20 are shown which are supplied by the pulse former 10. The counter 14 has a counting capacity of 8 counting steps. Each time it reaches the counting end, it supplies a pulse at the output 15, which is delayed in the delay means 16 to such an extent, that the beam suppression for the picture change B 22 and the control of the sawtooth generator 12 for the vertical deviation can take place at the right moment. These signals are represented in FIG. 2 in the second (22) and third (24) lines, respectively. If the beam suppression periods are disregarded, eight lines of the picture projected on the picture plane 5 are scanned. The scanning scheme which shows the path of the cathode is indicated in FIG. 3. As the scanning of a line takes approximately 64 microseconds, about 0.5 milliseconds are needed for the recording of the whole picture consisting of 8 lines, which results in a picture repeat frequency of approximate 2000 $sec^{-1}$. Due to the limitation to 8 lines by means of only slight modifications in a conventional TV camera, the picture sequence frequency can thus be increased by approximately a factor of 40 as compared to a conventional TV half-frame. Naturally, the spatial resolution of the picture has suffered but only in the vertical direction, whereas the resolution in the line direction is of high quality. Thus, it is recommended to project the pictures of the processes to be recorded in such a way on the picture plane 5 of the camera so that the axis in which a high resolution is required runs parallel to the line direction. In another embodiment of the invention, an arrangement of two TV camera systems, with the same process being projected on the picture planes of both systems can be employed so that the systems differ from one another in such that the line direction of one camera system is perpendicular to the other. The video signals can be correlated by a computer.

The video signals which are available at the output 8 of the video amplifier 7 for the scanning of only p lines per picture could be supplied immediately to a conventional TV receiver. A narrow band of 8 lines at the upper picture edge would result therefrom, containing the whole information of a picture and followed by more bands downwards, and originating from the following scanning cycles. The optical view of the processes is, however, not the main feature of the processes in question. Preferably, the video signals are digitized and stored in a data processing device for purposes of analysis. Then, for the optical representation of a synthetic picture of the process, the jumped-over lines could be completed either by a repetition of the information in the preceding lines or by an interpolation between successive lines.

If the pitch fixed by the value $p=8$ is too coarse, the counter 14 can easily be switched to a greater value of p, such as 12, 13, 24, 26, 39, 52, 78 which are integer dividers of 312. Accordingly, the picture scanning can be provided in 0.77 ms, 9.83 ms, 1.53 ms, 2.66 ms, 3.33 ms, or 5 ms, respectively, rather than 0.5 ms. It is thus possible, depending on the speed of the process to be recorded, to determine the optimal time resolution with the best possible spatial resolution, by a simple adjustment of the counting capacity of the counter 14.

It is also conceivable to move the scheme, for example, of the eight lines per picture from one scanning cycle to the next one, so that the interspaces between the lines of a picture are filled by succeeding scannings of the picture plane 5. The delay time of the delay means 16 has to be slightly changed to control the scanning of the picture plane 5 from one scanning cycle to the next one. As shown in FIG. 2, if this delay time is for example reduced by some microseconds, the picture change 22 appears as a fraction of a line scanning earlier and the first scanned line is vertically moved with respect to preceding scanning cycles. In the last line of FIG. 2, such a partially moved vertical deviation signal 26 is shown, in which the first picture cycle shown starts with line 1, the second with a later line and the third again with line 1, etc. Thus, for example, a picture of 8 lines such as explained above could be recorded, to first scan in the counting mode of the TV picture the lines 1, 79, 157, 235, 313, 391, 469 and 547, and in the next picture cycle scan a picture with the lines 40, 118, 196, 274, 352, 430, 508 and 586.

Also in this case it is not important to produce an optically readable picture, since the filling-up of the gaps is carried out by information which has been recorded later and in rapid processes, this information does not correspond to the state during the scanning of the first picture. Such scanning cycles are however useful for the automatic digital picture evaluation, because their grade of actuality can be taken into account during the analysis of the observed process.

In any case, processes can be analyzed in this way for which up to now very expensive film cameras with rotating mirrors had to be used, which however, as already mentioned, were not suited for an immediate analysis by a computer.

The device of the invention is also suited for recording IR, UV or X-ray pictures.

I claim:

1. A device for the optical recording of rapid processes with at least one TV camera, which comprises means for deviating and suppressing a scanning beam, in order to make the scanning beam run successively and cyclically over N lines of a picture plane on which the processes are projected, line pulses being produced during scanning of said N lines, the device further comprising:

cyclic line counter means for carrying out one counting step for each of said line pulses and providing an end-of-count pulse after p line pulses, N/p being an integer $>>1$, the TV camera having a beam suppression circuit with the end-of-count pulse being applied thereto for suppressing the scanning beam;

and a sawtooth generator, synchronized with the end-of-count pulse of the counter means, for controlling the vertical deviation of the scanning beam.

2. A device according to claim 1, wherein the line counter means is a programmable counter.

3. A device according to claim 1 further comprising two TV cameras intended to record the same process, disposed in an arrangement such that the line directions of said two TV cameras are perpendicular to one another.

4. A device for the optical recording of rapid processes with at least one TV camera, which comprises means for deviating and suppressing a scanning beam, in order to make the scanning beam run successively and cyclically over N lines of a picture plane on which the processes are projected, line pulses being produced during scanning of said N lines, the device further comprising:

cyclic line counter means for carrying out one counting step for each of said line pulses and providing an end-of-count pulse after p line pulses, where N/p is an integer >>1;

the TV camera having a beam suppression circuit with the end-of-count pulse applied thereto for suppressing the scanning beam; and a sawtooth generator, synchronized with the end-of-count pulse of the counter means, for controlling the vertical deviation of the scanning beam;

wherein the sawtooth generator and the beam suppression circuit are controlled via a delay device, the delay time of which constitutes a selectable part of a line period and which is triggered by the end-of-count pulse from the counter means.

5. A device according to claim 2, wherein the line counter means is a programmable counter.

6. A device according to claim 2 further comprising two TV cameras intended to record the same process, disposed in an arrangement such that the line directions of said two TV cameras are perpendicular to one another.

* * * * *